US008797870B2

(12) United States Patent
Shankar J et al.

(10) Patent No.: US 8,797,870 B2
(45) Date of Patent: Aug. 5, 2014

(54) METHOD AND SYSTEM FOR CALCULATION OF QOV METRICS

(75) Inventors: Shiva Shankar J, Bangalore (IN); Ottalingam Satyanarayan, Fremont, CA (US); Srinivas Muktevi, Bangalore (IN); Naresh Chand, Noida (IN)

(73) Assignee: Cisco Technology, Inc., San Jose, CA (US)

( * ) Notice: Subject to any disclaimer, the term of this patent is extended or adjusted under 35 U.S.C. 154(b) by 1588 days.

(21) Appl. No.: 11/327,532

(22) Filed: Jan. 5, 2006

(65) Prior Publication Data

US 2007/0153772 A1    Jul. 5, 2007

(51) Int. Cl.
*H04L 12/26* (2006.01)
*H04B 7/216* (2006.01)

(52) U.S. Cl.
USPC ............ 370/235; 370/236; 370/241; 370/231

(58) Field of Classification Search
USPC .............. 370/352, 241, 251, 252, 244, 241.1, 370/235, 253, 231, 236
See application file for complete search history.

(56) References Cited

U.S. PATENT DOCUMENTS

| | | | | |
|---|---|---|---|---|
| 6,665,725 B1 * | 12/2003 | Dietz et al. | ..... | 709/230 |
| 6,757,543 B2 * | 6/2004 | Moran et al. | ..... | 455/456.1 |
| 7,088,706 B2 * | 8/2006 | Zhang et al. | ..... | 370/352 |
| 7,099,281 B1 * | 8/2006 | Conway | ..... | 370/252 |
| 7,299,277 B1 * | 11/2007 | Moran et al. | ..... | 709/224 |
| 7,512,069 B2 * | 3/2009 | Hedayat et al. | ..... | 370/230.1 |
| 7,729,268 B2 * | 6/2010 | Matta et al. | ..... | 370/252 |
| 7,843,843 B1 * | 11/2010 | Papp et al. | ..... | 370/252 |
| 7,894,355 B2 * | 2/2011 | Bennett | ..... | 370/252 |
| 8,503,299 B2 * | 8/2013 | Senarath et al. | ..... | 370/235 |
| 2001/0009547 A1 * | 7/2001 | Jinzaki et al. | ..... | 370/390 |
| 2003/0048812 A1 * | 3/2003 | Gross | ..... | 370/516 |
| 2003/0108033 A1 * | 6/2003 | Raisanen et al. | ..... | 370/352 |
| 2003/0115316 A1 * | 6/2003 | Yang-Huffman | ..... | 709/224 |
| 2004/0062252 A1 * | 4/2004 | Dowdal et al. | ..... | 370/395.62 |
| 2004/0066775 A1 * | 4/2004 | Grovenburg | ..... | 370/350 |
| 2004/0165570 A1 * | 8/2004 | Lee | ..... | 370/349 |
| 2004/0210632 A1 * | 10/2004 | Carlson et al. | ..... | 709/203 |
| 2005/0007952 A1 * | 1/2005 | Scott | ..... | 370/229 |
| 2005/0094628 A1 * | 5/2005 | Ngamwongwattana et al. | ..... | 370/352 |
| 2005/0207342 A1 * | 9/2005 | Tanabe et al. | ..... | 370/235 |
| 2005/0232309 A1 * | 10/2005 | Kavaler | ..... | 370/519 |
| 2006/0239204 A1 * | 10/2006 | Bordonaro et al. | ..... | 370/253 |
| 2006/0250965 A1 * | 11/2006 | Irwin | ..... | 370/238 |
| 2007/0116057 A1 * | 5/2007 | Murphy et al. | ..... | 370/503 |

OTHER PUBLICATIONS

Timothy A. Hall, "Objective Speech Quality Measures for Internet Telephony", 9 pages, Gaithersburg, MD 20899-8920.
Brad Webster et al., "Whitepaper. The Need for IP Telephony Monitoring and Management", 12 pages, VoIP State of the Market Report, Webtorials, Oct. 2004.

* cited by examiner

*Primary Examiner* — Asad Nawaz
*Assistant Examiner* — Wutchung Chu
(74) *Attorney, Agent, or Firm* — Fish & Richardson P.C.

(57) ABSTRACT

A method, system and apparatus are provided for measuring the quality of voice (QOV) in a communication network. A time-stamped voice data packet is received. The time stamped on the voice data packet indicates the time at which the voice data packet arrives at intermediate devices. In an embodiment of the invention, the intermediate devices at each hop stamp the time. Thereafter, the voice data packets are analyzed to measure the quality of voice in the communication network.

26 Claims, 5 Drawing Sheets

METHOD AND SYSTEM FOR CALCULATION OF QOV METRICS

BACKGROUND OF THE INVENTION

1. Field of Invention

Embodiments of the invention relate in general to communication over the Internet. More specifically, the embodiments of the invention relate to a method and a system for the evaluation of the quality of voice of communication over the Internet.

2. Description of the Background Art

Networks such as the Internet are widely used for voice communication. Voice communication techniques such as Voice Over Internet Protocol (VOIP) have emerged as alternatives to the conventional techniques such as Public Switched Telephone Networks (PSTN). The VOIP technique transmits voice information in packets of data. Voice information is encoded and compressed to form a data packet. Thereafter, these packets are transmitted over the network by the means of various Internet Protocols (IP) such as User Datagram Protocol (UDP) or Real-Time Transport Protocol (RTP). RTP is an Internet-standard protocol for the transport of real-time data, which includes audio and video data. RTP is used in voice-over-IP architectures, for video conferencing, media-on-demand, and other applications. The data packets transmitted in the network are carried from a source to a destination by utilizing switches. A switch is a network device that selects a path to send a unit of data to its next destination;

In the process of voice communication over the networks, the quality of voice (QOV) may deteriorate due to loss of packets, delay in data transmission, instability or fluctuation of the data transmission with time and the like. The quality of voice can be improved by an analysis and measurement of voice quality when the data is being transmitted.

An existing method uses Switched Port Analyzer (SPAN) to measure and analyze the quality of voice. In this method a copy of data packets received at an intermediate switch is forwarded to a remote station for analysis of the quality of voice. However, the data packets are not time-stamped at the intermediate switch. As a result, the exact location where the quality of voice is affected in the path of the transmitted data cannot be identified. For example, it may not be possible to locate a particular switch where the data loss occurred.

DETAILED DESCRIPTION OF EMBODIMENTS OF THE INVENTION

The various embodiments of the invention provide a method, a system, an apparatus, and a computer-readable medium for measuring quality of voice (QOV) in a communication network. In an embodiment of the invention, an intermediate device located at a hop, receives a voice data packet from a source. Thereafter, the voice data packets are stamped with a time. The time stamped on the voice data packet indicates the time at which the voice data packet arrived at the intermediate device. Subsequently, the voice data packet is sent to the next intermediate device located at the next hop, and a copy of the voice data packet is sent to a network management station. The voice data packet is stamped with the time and a copy of voice data packet is sent to the network management system at each hop. The network management station analyzes the copy of voice data packet received from each hop and measures the quality of voice.

Figure 1:
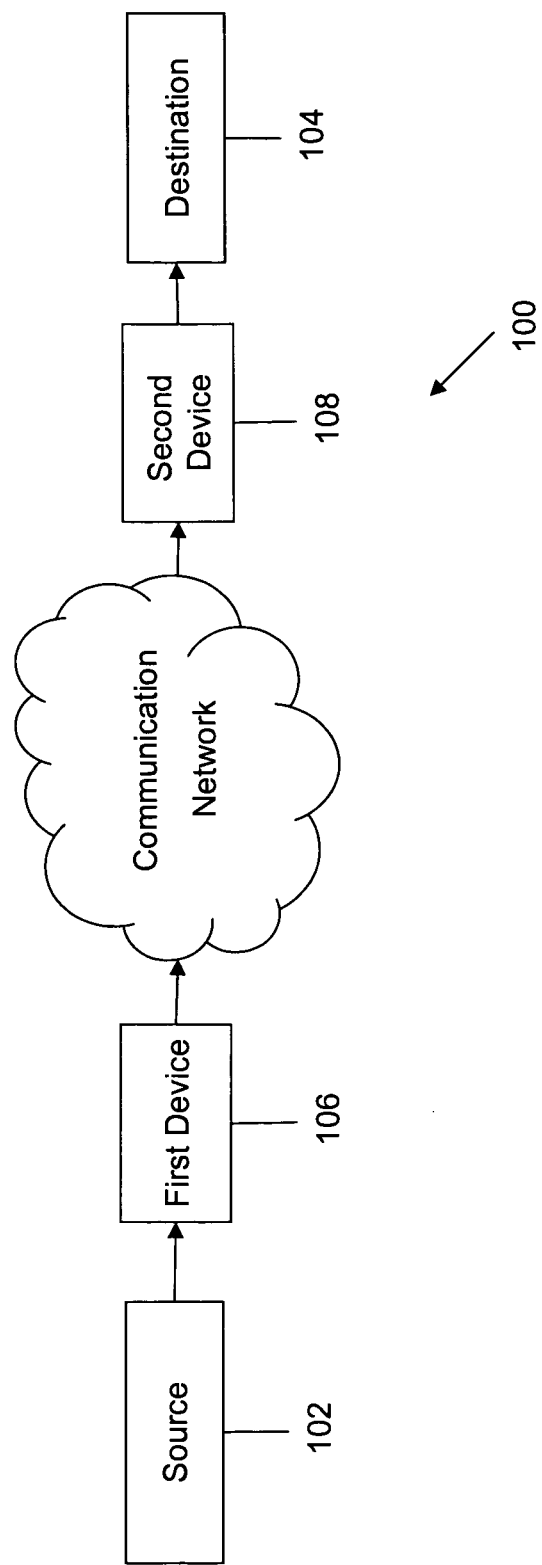
FIG. 1 illustrates an exemplary environment, wherein the embodiments of the invention can be practiced.

FIG. 1 illustrates an exemplary communication network 100 wherein the embodiment of the invention can be practiced. Communication network 100 includes a source 102, a destination 104, a first device 106, and a second device 108, in accordance with an exemplary embodiment of the present invention. In an embodiment of the invention, source 102 and destination 104 can be a personal computer, a general-purpose computer, a laptop, a palmtop, or any other fixed or mobile communication device. In an embodiment of the invention, first device 106 and second device 108 can be network devices such as router, switch and the like.

In an embodiment of the invention, communication network 100 may include Local Area Network (LAN), Wide Area Network (WAN), and so forth. In another embodiment of the invention, communication network 100 is a channel for transmitting data, including audio, video or multimedia. Communication network 100 is hereinafter referred to as Voice Over Internet Protocol (VOIP) network 100. The data that is to be transmitted in VOIP network 100 is converted into packets of data. Source 102 sends a series of data packets to destination 104. In an embodiment of the invention, the data packet includes voice data. In an embodiment of the invention, VOIP network 100 defines the protocols and systems for transmitting the data packet. In an embodiment of the invention, the Real Time Transport Protocol (RTP) is used to transmit data packets over VOIP network 100. In another embodiment of the invention, protocols such as Transmission Control Protocol (TCP), User Datagram Protocol (UDP) and the like may be used to transmit the data packet.

According to various embodiments of the invention, the data packet is transmitted hop-by-hop from source 102. to destination 104. In an embodiment of the invention, the data packet hops from source 102 to first device 106. Thereafter, the data packet hops from first device 106 to second device 108 over communication network 100 to reach destination 104. One skilled in the art will understand that, although not illustrated, there may be additional intervening hops between first and second device 106 and 108. In an embodiment of the invention, a copy of the data packet is transmitted to a network device to monitor the traffic in VOIP network 100. In another embodiment of the invention, a copy of the data packet is transmitted to the network device to analyze characteristics of the data packet. The characteristics of the data packet include delay in transmission, fluctuation in data transmission rate, packet loss and the like.

Figure 2:
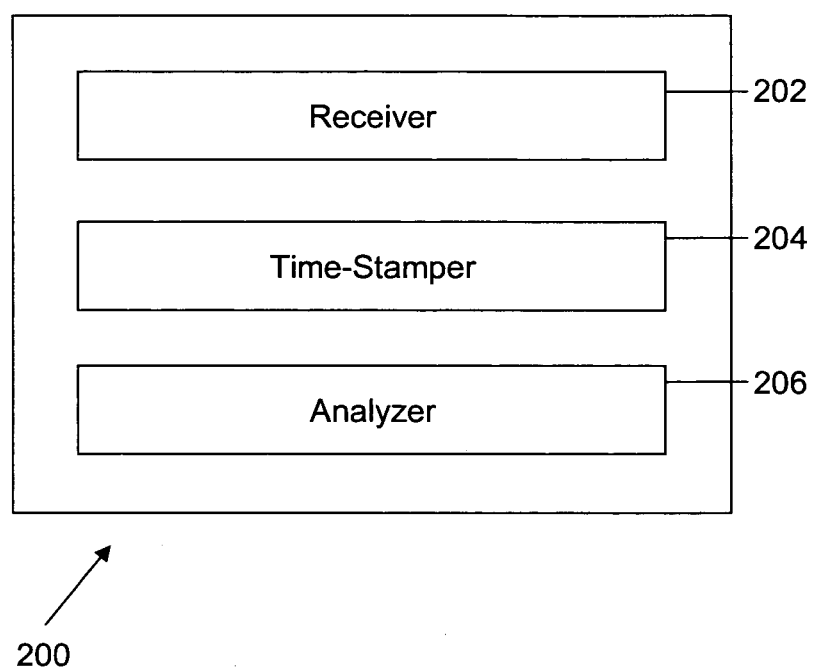
FIG. 2 is a block diagram of a system for transmitting a data packet, in accordance with an exemplary embodiment of the present invention.

FIG. 2 illustrates system 200 for transmitting a data packet, in accordance with an exemplary embodiment of the present invention. System 200 includes a receiver 202, a time-stamper 204 and an analyzer 206. Receiver 202 receives a voice data packet. In an embodiment of the invention, receiver 202 receives the voice data packet from the network devices. In another embodiment of the invention, receiver 202 receives the voice data packet from source 102. In an embodiment of the invention, receiver 202 is located at network devices in VOIP network 100, such as switches.

Time-stamper 204 stamps a time on the voice data packet. In an embodiment of the invention, the time stamped on the voice data packet indicates the time at which receiver 202 receives the voice data packet. Time-stamper 204 is located at network devices in VOIP network 100, such as switches.

Analyzer 206 analyzes the voice data packets that are time stamped by time-stamper 204. The voice data packet is analyzed to measure the quality of voice in VOIP network 100. In an embodiment of the invention, analyzer 206 is located on network devices that monitor network traffic.

Figure 3:
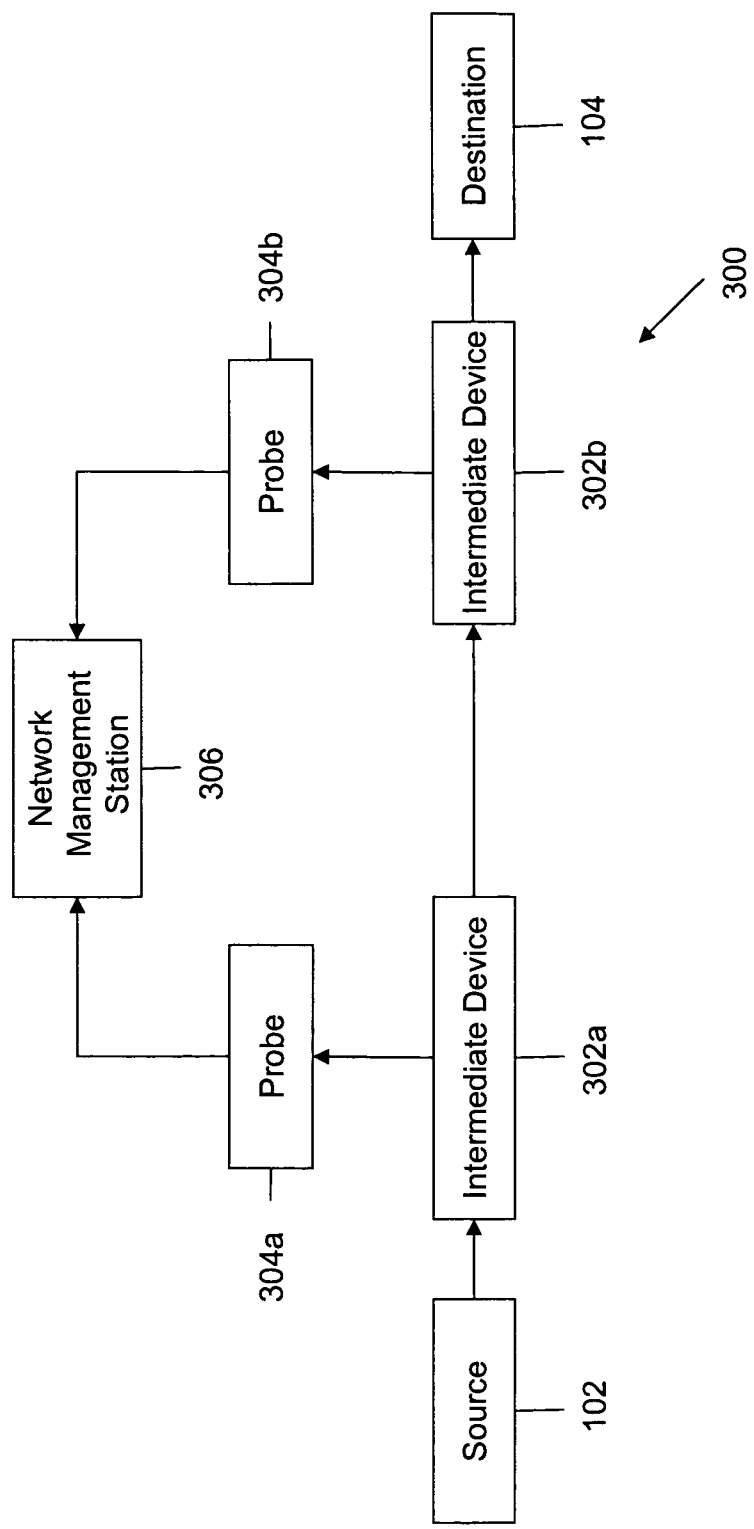
FIG. 3 is a block diagram of a system for transmitting a data packet, in accordance with another exemplary embodiment of the present invention.

FIG. 3 is a block diagram of system 300 for transmitting a data packet, in accordance with an exemplary embodiment of the present invention. System 300 includes intermediate devices 302, probes 304, and a network management station 306.

In an embodiment of the invention, source 102 sends voice data packets to intermediate device 302a. In an embodiment of the invention, intermediate device 302a is a network device, such as a switch or router. The switch can establish communication channels or paths between the users at source 102 and destination 104 of VOIP network 100. The switch can also store and forward the voice data packet. In an embodiment of the invention, intermediate device 302a uses a Switched Port Analyzer (SPAN) port to forward a copy of the voice data packets to probe 304a.

In an embodiment of the invention, probe 304a can be a Remote Monitoring (RMON) probe. The RMON is a standard monitoring specification that enables various network monitors and console systems to exchange network-monitoring data. The RMON specification provides capabilities for monitoring network traffic, detecting and reporting problems.

In an embodiment of the invention, intermediate device 302a stamps a time on the voice data packet after receiving the voice data packet. The time stamped on the voice data packet indicates the time at which the voice data packet arrived at intermediate device 302a. The time can be stamped on the voice data packet by using time-stamper 204. In an embodiment of the invention, intermediate device 302a receives the voice data packet from source 102 or other network devices.

Intermediate device 302a sends the voice data packet to intermediate device 302b, which sends a copy of the voice data packet to probe 304b. Probes 304a and 304b each send the voice data packet to network management station 306. In an embodiment of the invention, network management station 306 analyzes the received voice data packet, based on the time stamped on the voice data packet. The voice data packet is analyzed by using analyzer 206. In an embodiment of the invention, intermediate device 302b sends the voice data packet to destination 104. Although only two intermediate devices are illustrated in FIG. 3, one skilled in the art will appreciate that any number of such intermediate devices may participate in forwarding the data packets from the source to the destination. Further, each of such intermediate devices may forward copies of voice data packets to network management station 306.

Figure 4:
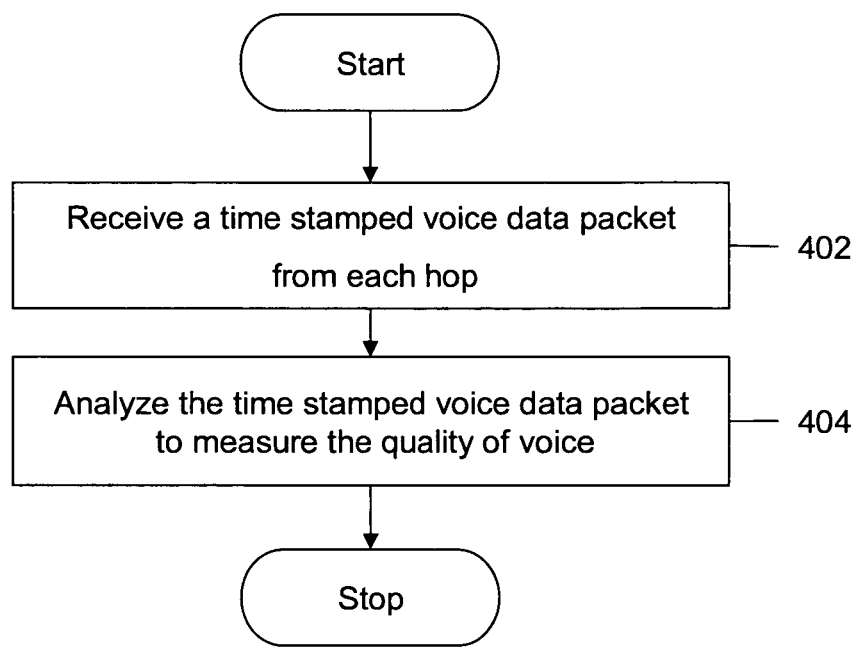
FIG. 4 is a flowchart depicting a method for measuring quality of voice, in accordance with an exemplary embodiment of the present invention.

FIG. 4 is a flowchart depicting a method for measuring quality of voice, in accordance with an exemplary embodiment of the present invention. In an embodiment of the invention, a voice data packet is received from source 102 at step 402. In another embodiment of the invention, the voice data packet is received from an intermediate device 302. In an embodiment of the invention, the voice data packet is received at network management station 306. The voice data packet is stamped with the time at which the voice data packet arrives at intermediate device 302. Thereafter, at step 404, the time-stamped voice data packet is analyzed, to measure the quality of voice at network management station 306.

Figure 5:
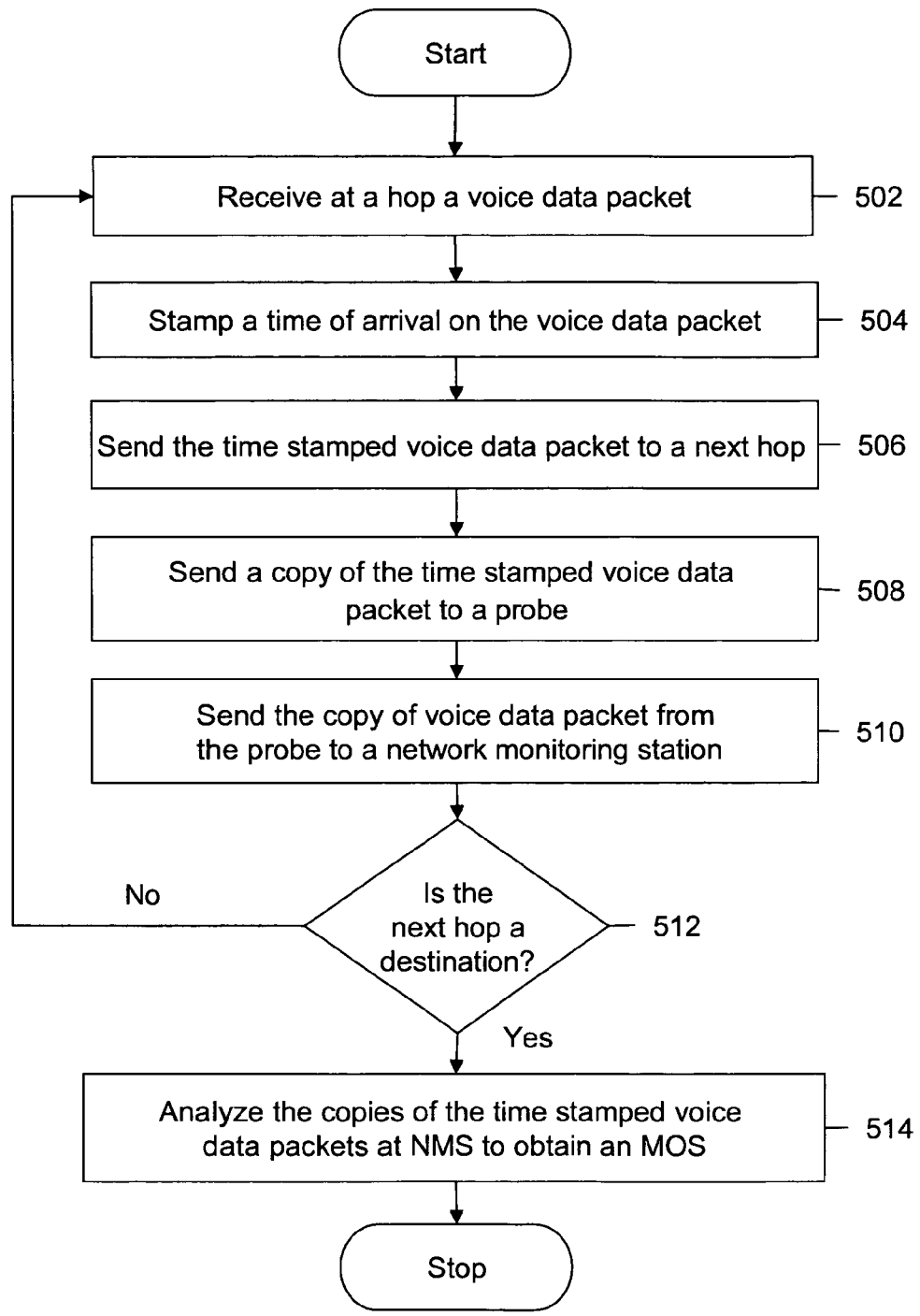
FIG. 5 is a flowchart depicting another method for measuring quality of voice, in accordance with an exemplary embodiment of the present invention.

FIG. 5 is a flowchart depicting another method for measuring quality of voice, in accordance with an exemplary embodiment of the present invention. At step 502, a voice data packet is received at a hop in VOIP network 100. In an embodiment of the invention, the voice data packet is sent from source 102. In another embodiment of the invention, the voice data packet is sent hop-by-hop from source 102 to destination 104 through intermediate device 302. The voice data packet is received at intermediate device 302 located at each hop. In an embodiment of the invention, the voice data packet is received by using receiver 202.

Thereafter, at step 504, the time of receipt of the voice data packet is stamped on or associated with the voice data packet. The time can be stamped by intermediate device 302, and in one embodiment by time-stamper 204. The time stamp indicates the arrival time of the voice data packet at intermediate device 302. In an embodiment of the invention, the time is stamped on the basis of the Network Time Protocol (NTP) protocol. The NTP protocol is used to synchronize the computer clocks in a network of computers. This is required to ensure that the time stamped on the voice data packet is accurate.

In an embodiment of the invention, the time stamp is stored in the voice data packet in Internet Protocol (IP) options or by using a header extension of the voice data packet. For example, IP Option4 may be used to store time in the voice data packet.

Thereafter, at step 506, the voice data packet is sent to a next hop. In an embodiment of the invention, the next hop for the voice data packet is intermediate device 302. Subsequently, at step 508, a copy of the time-stamped voice data packet is sent to a probe. The time-stamped voice data packet is copied, by using a Switched Port Analyzer (SPAN) port, in an embodiment of the invention. The SPAN port selects network traffic for analysis by a network analyzer such as a probe device or RMON probe.

At step 510, the time-stamped voice data packets copied to the probe are transmitted to network management station 306. In an embodiment of the invention, network management station 306 monitors the traffic in VOIP network 100 for problems related to data transmission, such as delay in transmission, jitter, or packet loss. The delay in transmission is due to the time taken from one hop to another in VOIP network 100. Jitter is the variation in delay in transmission over time from hop-to-hop in VOIP network 100. Packet loss implies the loss of data packets during data transmission in VOIP network 100.

At step 512, if the next hop is not at intermediate device 302, then the time-stamped voice data packet is analyzed at network management station 306, at step 514. In an embodiment of the invention, the voice data packets are analyzed by using analyzer 206. At step 512, if the next hop is at intermediate device 302, then the voice data packet is stamped with time, and a copy is sent to network management station 306.

In an embodiment of the invention, the network management station calculates the difference between the times stamped on the voice data packets received from the probes. In an embodiment of the invention, this difference is used to obtain the delay in transmission of the voice data packet. In an embodiment of the invention, the difference in times is used to calculate jitter.

In an embodiment of the invention, delay in transmission and jitter are used to obtain a Mean Opinion Score (MOS) for the quality of voice. The MOS provides a numerical measure of the quality of voice at the destination of the network. The MOS is measured by communication over the network with the help of human speakers and listeners. The human listener rates each sentence communicated by the human speaker on a five-point scale: bad-1; poor-2; fair-3; good-4 and excellent-5. An arithmetic mean of the individual scores is calculated. The arithmetic mean uses the difference in the time and jitter, to calculate the MOS.

Embodiments of the present invention provide a method and a system to calculate QOV metrics in a communication network. The quality of voice is measured at each hop in the communication network. Moreover, the analysis is conducted during the communication, without introducing a synthetic traffic. Further, packet loss and jitter are also considered to obtain an MOS.

Although the invention has been discussed with respect to specific embodiments thereof, these embodiments are merely illustrative, and not restrictive, of the invention. For example, a 'method for calculation of QOV metrics' can include any type of analysis, manual or automatic, to anticipate the needs of voice quality measurements.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for measuring quality of voice in a communication network, the method comprising:
   receiving, from a source of a voice data packet, the voice data packet at a first intermediate device located at a hop in the communication network;
   appending, by the first intermediate device, a first time stamp to the voice data packet indicating a time at which the voice data packet arrived at the first intermediate device;
   generating, at the first intermediate device, a copy of the voice data packet with the first time stamp;
   sending, from the first intermediate device, the copy of the voice data packet with the first time stamp relating to packet interaction with the first intermediate device but without a time stamp relating to packet interaction with a second intermediate device;
   receiving the voice data packet with the first time stamp at a second intermediate device located at a next hop in the communication network;
   appending, by the second intermediate device, a second time stamp to the voice data packet indicating a time at which the voice data packet arrives at the second intermediate device, wherein the first and second intermediate devices have internal clocks, and wherein the internal clock of the second intermediate device is synchronized with the internal clock of the first intermediate device;
   generating, at the second intermediate device, a copy of the voice data packet with the second time stamp;
   sending from at least the second intermediate device, the copy of the voice data packet to a monitoring station, including sending, from the second intermediate device, the copy of the voice data packet appended with the first and second time stamps from each of the first intermediate device and second intermediate device;
   calculating, by the monitoring station, a difference between the first and second time stamps appended on the copy of the voice data packet;
   determining, by the monitoring station, a delay in transmission between the first intermediate device and the second intermediate device based on calculating the difference between the first and second time stamps; and
   determining an indication of the quality of voice available in the communication network based on determining the delay in transmission.

2. The method of claim 1, further comprising determining, by the monitoring station, an amount of jitter in transmission of the voice data packet between the first and second intermediate devices.

3. The method of claim 2, further comprising calculating a Mean Opinion Score (MOS) for the quality of voice using the determined delay in transmission and the determined amount of jitter.

4. The method of claim 3, further comprising:
   determining a level of packet loss; and
   using the determined level of packet loss to determine the MOS.

5. The method of claim 1, wherein determining the indication of the quality of voice available in the communication network comprises analyzing appended time stamps from a copy of the voice data packet at a last hop where the voice data packet was present in the communication network.

6. The method of claim 1, wherein the second intermediate device is configured with a Switched Port Analyzer (SPAN) port.

7. The method of claim 6, further comprising generating, with the SPAN port, the copy of the voice data packet.

8. The method of claim 6, further comprising selecting, with the SPAN port, the copy of the voice data packet sent to the monitoring station.

9. A system for measuring quality of voice in a communication network, the system comprising:
   a first intermediate device and a second intermediate device located at first and second hops respectively in the communication network, each of the first and second intermediate devices including:
     a receiver configured to receive a voice data packet from a source of the voice data packet or a network device in the communication network; and
     a time stamper configured to append a time stamp to the voice data packet indicating a time at which the voice data packet arrived at the respective intermediate device,
   wherein the first and second intermediate devices each include internal clocks that are configured to be synchronized with each other, each of the first and second intermediate devices configured to generate a copy of the voice data packet with first and second time stamps respectively appended to the respective copy of the voice data packet, and
   wherein the first intermediate device is configured to send a copy of the voice data packet with a time stamp relating to packet interaction with the first intermediate device but without a time stamp relating to packet interaction with the second intermediate device, while the second intermediate device is configured to send a copy of the voice data packet appended with time stamps from each of the first intermediate device and second intermediate device; and a monitoring station that is configured to receive copies of the time stamped voice data packet from at least the second intermediate device, the monitoring station configured to determine a delay in transmission between the first intermediate device and the second intermediate device based on calculating a difference between the first and second time stamps, the monitoring station including:

a means for analyzing the copies of the time stamped voice data packet to measure the quality of voice in the communication network.

10. The system of claim 9, wherein the first and second time stamps are based on Network Time Protocol (NTP).

11. The system of claim 9, wherein the means for analyzing further comprises means for calculating a jitter in the communication network between the first and second hops.

12. The system of claim 9, further comprising means for obtaining a Mean Opinion Score (MOS).

13. The system of claim 12, wherein each of the first and second intermediate devices is enabled for Switched Port Analyzer (SPAN) traffic.

14. The system of claim 9, further comprising a source device to transmit voice data packets and a destination device adapted to receive voice data packets.

15. The system of claim 14, wherein the source device and the destination device are each an IP telephony device.

16. A computer program product embodied on a non-transitory computer readable medium including instructions executable by one or more processors, wherein the instructions, when executed, are configured to cause the one or more processors to perform operations comprising:

receiving, from a source of a voice data packet, the voice data packet at a first intermediate device located at a hop in a communication network;

appending, by the first intermediate device, a first time stamp to the voice data packet indicating a time at which the voice data packet arrived at the first intermediate device;

generating, at the first intermediate device, a copy of the voice data packet with the appended first time stamp;

sending, from the first intermediate device, the copy of the voice data packet with the first time stamp relating to packet interaction with the first intermediate device but without a time stamp relating to packet interaction with a second intermediate device;

receiving the voice data packet with the first time stamp at a second intermediate device located at a next hop in the communication network;

appending, by the second intermediate device, a second time stamp to the voice data packet indicating a time at which the voice data packet arrives at the second intermediate device, wherein the first and second intermediate devices have internal clocks, and wherein the internal clock of the second intermediate device is synchronized with the internal clock of the first intermediate device;

generating, at the second intermediate device, a copy of the voice data packet with the appended second time stamp;

sending from at least the second intermediate device, the copy of the voice data packet to a monitoring station, including sending, from the second intermediate device, the copy of the voice data packet appended with the first and second time stamps from each of the first intermediate device and second intermediate device;

calculating, by the monitoring station, a difference between the first and second time stamps appended on the copy of the voice data packet;

determining, by the monitoring station, a delay in transmission between the first intermediate device and the second intermediate device based on calculating the difference between the first and second time stamps; and determining an indication of a quality of voice available in the communication network based on determining the delay in transmission.

17. The computer program product of claim 16, wherein the instructions for determining an indication of the quality of voice comprises instructions for causing the one or more processors to determine an amount of jitter in transmission of the voice data packet between the first and second intermediate devices.

18. The computer program product of claim 17, further comprising instructions for causing the one or more processors to calculate a Mean Opinion Score (MOS) for the quality of voice using the determined delay in transmission and the determined amount of jitter.

19. The computer program product of claim 18, further comprising instructions for causing the one or more processors to perform operations comprising:

determining a level of packet loss; and using the determined level of packet loss to determine the MOS.

20. The computer program product of claim 18, wherein the instructions for determining the indication of the quality of voice available in the communication network comprises instructions for causing the one or more processors to analyze appended time stamps from a copy of the voice data packet at a last hop where the voice data packet was present in the communication network.

21. A method comprising:

receiving, at a network management station in a communication network, a first copy of a voice data packet from a first intermediate device that is located at a first hop in the communication network between a source of the voice data packet and a destination of the voice data packet, the first copy of the voice data packet generated by the first intermediate device and including a first time stamp representing a time of arrival of the voice data packet at the first intermediate device, the first time stamp appended to the first copy of the voice data packet by the first intermediate device;

receiving, at the network management station, a second copy of the voice data packet from a second intermediate device that is located at a second hop in the communication network between the source and the destination of the voice data packet, the second intermediate device receiving the voice data packet subsequent to the first intermediate device receiving the voice data packet, the second copy of the voice data packet generated by the second intermediate device and including a second time stamp representing a time of arrival of the voice data packet at the second intermediate device, the second time stamp appended to the second copy of the voice data packet by the second intermediate device, wherein the first intermediate device is configured to send the first copy of the voice data packet with the first time stamp relating to packet interaction with the first intermediate device but without a time stamp relating to packet interaction with the second intermediate device, while the second intermediate device is configured to send the second copy of the voice data packet appended with the first and second time stamps from each of the first intermediate device and second intermediate device;

calculating, by the network management station, a difference in time between the time of arrival of the voice data packet at the first intermediate device and time of arrival of the voice data packet at the second intermediate device based on the first time stamp and the second time stamp; and determining, by the network management station, at least one of a delay in transmission and an amount of jitter between the first intermediate device and the second intermediate device based on the calculated difference in time.

22. The method of claim 21, wherein the first intermediate device and the second intermediate device include network switches.

23. The method of claim 21, wherein the first intermediate device appends the first time stamp to the first copy of the voice data packet using an Internet Protocol (IP) options field in a header of the first copy of the voice data packet.

24. The method of claim 23, wherein the first intermediate device appends the first time stamp to the first copy of the voice data packet using IP option4 field in the header of the first copy of the voice data packet.

25. The method of claim 21, wherein the first intermediate device appends the first time stamp to the first copy of the voice data packet using a header extension of the first copy of the voice data packet.

26. The method of claim 21, wherein the network management station receives at least one of the first copy of the voice data packet and the second copy of the voice data packet through a first remote monitoring probe (RMON) connected to the first intermediate device and a second RMON connected to the second intermediate device respectively.

* * * * *